United States Patent
Bhaya et al.

(10) Patent No.: US 10,924,376 B2
(45) Date of Patent: Feb. 16, 2021

(54) SELECTIVE SENSOR POLLING

(71) Applicant: Google Inc., Mountain View, CA (US)

(72) Inventors: Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 15/395,715

(22) Filed: Dec. 30, 2016

(65) Prior Publication Data

US 2018/0191596 A1 Jul. 5, 2018

(51) Int. Cl.
| | |
|---|---|
| H04L 12/26 | (2006.01) |
| G06F 16/683 | (2019.01) |
| G06F 16/33 | (2019.01) |
| G10L 15/26 | (2006.01) |
| G06F 3/16 | (2006.01) |
| G06F 40/186 | (2020.01) |
| G10L 15/18 | (2013.01) |
| G10L 15/22 | (2006.01) |
| H04L 12/24 | (2006.01) |
| H04L 29/08 | (2006.01) |
| G10L 15/08 | (2006.01) |

(52) U.S. Cl.
CPC ............ *H04L 43/103* (2013.01); *G06F 3/167* (2013.01); *G06F 16/3344* (2019.01); *G06F 16/683* (2019.01); *G06F 40/186* (2020.01); *G10L 15/1822* (2013.01); *G10L 15/22* (2013.01); *G10L 15/26* (2013.01); *H04L 41/0813* (2013.01); *H04L 67/12* (2013.01); *G10L 2015/088* (2013.01); *G10L 2015/223* (2013.01)

(58) Field of Classification Search
CPC ... H04L 43/103; H04L 41/0813; H04L 67/12; G06F 3/167; G06F 17/248; G06F 17/30684; G06F 17/30743; G10L 15/1822; G10L 15/22; G10L 15/26
USPC .......................................................... 709/217
See application file for complete search history.

(56) References Cited

U.S. PATENT DOCUMENTS

| | | | |
|---|---|---|---|
| 6,275,806 | B1 | 8/2001 | Pertrushin |
| 6,684,249 | B1 | 1/2004 | Frerichs et al. |

(Continued)

FOREIGN PATENT DOCUMENTS

WO WO-2011/037804 A3 3/2011

OTHER PUBLICATIONS

"Amazon and Google Want to Turn Their Smart Home Speakers Into Telephone Replacements—Mac Rumors" MacRumors, 9 pages.

(Continued)

*Primary Examiner* — Kevin S Mai
(74) *Attorney, Agent, or Firm* — Foley & Lardner LLP; James De Vellis

(57) ABSTRACT

A selective sensor polling system for a voice activated data packet based computer network environment is provided. A system can receive audio signals detected by a microphone of a device. The system can parse the audio signal to identify trigger keyword and request. The system can select a template for an action data structure with a plurality of fields. The system can determine to poll a first sensor for data for the first field. The system can determine to obtain data in memory previously collected by the second sensor. The system can generate and transmit the action data structure with the data from the sensor and memory, and transmit the action data structure to a third party device.

20 Claims, 4 Drawing Sheets

(56) References Cited

U.S. PATENT DOCUMENTS

| | | | |
|---|---|---|---|
| 6,857,007 | B1 | 2/2005 | Bloomfield |
| 7,853,255 | B2 | 12/2010 | Karaoguz et al. |
| 8,195,133 | B2 | 6/2012 | Ramer et al. |
| 8,386,386 | B1 | 2/2013 | Zhu |
| 8,903,716 | B2 | 12/2014 | Chen et al. |
| 2007/0097975 | A1 | 5/2007 | Rakers et al. |
| 2007/0127688 | A1 | 6/2007 | Doulton |
| 2012/0265528 | A1 | 10/2012 | Gruber et al. |
| 2013/0117022 | A1 | 5/2013 | Chen et al. |
| 2013/0275164 | A1 | 10/2013 | Gruber et al. |
| 2013/0275875 | A1 | 10/2013 | Gruber et al. |
| 2013/0304758 | A1 | 11/2013 | Gruber et al. |
| 2014/0108019 | A1 | 4/2014 | Ehsani et al. |
| 2014/0222436 | A1* | 8/2014 | Binder .................... G06F 3/167 704/275 |
| 2016/0018879 | A1* | 1/2016 | Hsiao .................... G06F 1/3234 713/324 |
| 2016/0077892 | A1 | 3/2016 | Hendri et al. |
| 2016/0322044 | A1 | 11/2016 | Jung et al. |
| 2016/0328667 | A1* | 11/2016 | Macciola ........... G06Q 10/0633 |
| 2017/0086732 | A1* | 3/2017 | Tribble ................ A61B 5/0022 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |
| 2018/0091946 | A1* | 3/2018 | Venkatraman ........ H04W 4/029 |

OTHER PUBLICATIONS

"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Close, "Amazon Echo Will Give You These Deals If You Order Through Alexa This Weekend," Web Article, Nov. 18, 2016, Time. com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Nieva, Richard, "Google Home and eBay can tell you how much that's worth", 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges at Silicon Beach" 6 pages.
Simonite, "How Alexa, Siri, and Google Assistant Will Make Money Off You," Web Article, May 31, 2016, technologyreview. com (11 pages).
Simonite, "How Assistant Could End Up Eating Google's Lunch," Web Article, Sep. 23, 2016, technologyreview.com (9 pages).
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Coberly, "Apple patent filing reveals potential whispering Siri functionality", Techspot, Dec. 14, 2017, 4 pages.
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Appl. Ser. No. PCT/US2017/049779 dated Dec. 1, 2017, 12 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.

(56) References Cited

OTHER PUBLICATIONS

Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Sablich, Justin, "Planning a Trip With the Help of Google Home", New York Times, May 31, 2017 (6 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Buckland et al., "Amazon's Alexa Takes Open-Source Route to Beat Google Into Cars", Bloomberg, Feb. 27, 2018, 6 pages.
Korean Office Action for KR 10-2017-7031461 dated Dec. 1, 2018.
Foreign Action other than Search Report on KR 10-2019-7016186, dated Jun. 12, 2019, 8 pages.
https://developer.amazon.com/docs/device-apis/alexa-discovery.html, 31 pages.
https://developer.amazon.com/docs/smarthome/build-smart-home-skills-for-sensors.html, 7 pages.
Examination Report for IN Appln. Ser. No. 201747040058 dated Dec. 30, 2019 (6 pages).
Extended European Search Report for EP Appln. Ser. No. 19188032.7 dated Nov. 29, 2019 (6 pages).
Office Action for KR Appln. Ser. No. 10-2019-7034136 dated Jan. 20, 2020 (6 pages).
First Office Action in CN 201780001587.X, dated Jun. 2, 2020, 19 pages.

\* cited by examiner

SELECTIVE SENSOR POLLING

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

The present disclosure is generally directed to selectively polling sensors over a computer network. For example, computing systems may have access to multiple sensors configured on multiple computing devices that can detect the same or similar types of information. However, it may be resource intensive to request the same or similar types of information from multiple sensors either configured on the same computing device or a group of computing devices in close proximity to one another such that the detected information is similar. Furthermore, certain sensors, or computing device on which the sensor is configured, may consume greater resources (e.g., energy, battery power, processor utilization, or bandwidth) as compared to other sensors or computing devices. Thus, the systems and methods of the present disclosure can selectively poll one or more sensors to obtain information in a manner that reduces resource consumption.

Systems and methods of the present disclosure are generally directed to a data processing system that selectively polls sensors over a computer network. The data processing system can process voice-based input using voice models trained on aggregated voice input and augmented with end user voice input. The data processing system can identify a template for an action data structure based on a request and trigger keyword in the voice input. The data processing system can determine to populate one or more fields in the template to generate the action data structure. To populate the fields, the data processing system can interface with a sensor management component to selectively poll sensors of one or more computing devices associated with the end user that provided the voice input. The sensor management component can apply a policy or set of rules to identify one or more sensors that are available and can provide the values used to populate the fields of the template to generate the action data structure. The data processing system can receive the values from the selected sensors, generate the action data structure, and transmit the data structure to a third party provider device. The data processing system can then receive an indication from the third party provider device that the operation corresponding to the action data structure has been initiated.

At least one aspect is directed to a system to selectively poll sensors. The system can include a data processing system. The data processing system can execute a natural language processor ("NLP") component, direct action application programming interface ("API"), and sensor management component. The NLP component can receive, via an interface of the data processing system, data packets comprising an input audio signal detected by a microphone of a client device. The NLP can parse the input audio signal to identify a request and a trigger keyword corresponding to the request. The direct action API can select, based on the trigger keyword, a template for an action data structure responsive to the request. The template can include a first field. The sensor management component can identify a plurality of available sensors configured to obtain information for the first field. The plurality of available sensors can include a first sensor and a second sensor. The sensor management component can determine a status of each of the plurality of sensors. The sensor management component can select the first sensor of the plurality of sensors based on the status. The sensor management component can poll first sensor for data corresponding to the first field. The direct action API can populate the first field with the data received by the sensor management component responsive to the poll of the first sensor. The direct action API can generate the action data structure based on the first field of the template. The direct action API can transmit the action data structure to a third party provider device to cause the third party provider device to invoke an operation session between the third party provider device and the client device. The data processing system can receive, from the third party provider device, an indication that the third party provider device established the operation session with the client device.

At least one aspect is directed to a method of selectively polling sensors. The method can include the data processing system receiving, via an interface, data packets comprising an input audio signal detected by a microphone of a client device. The method can include the data processing system parsing the input audio signal to identify a request and a trigger keyword corresponding to the request. The method can include the data processing system selecting, based on the trigger keyword, a template for an action data structure responsive to the request. The template can include a first field. The method can include the data processing system identifying a plurality of available sensors configured to obtain information for the first field. The plurality of available sensors can include a first sensor and a second sensor. The method can include the data processing system determining a status of each of the plurality of sensors. The method can include the data processing system selecting the first sensor of the plurality of sensors based on the status. The method can include the data processing system polling the first sensor for data corresponding to the first field. The method can include the data processing system populating the first field based on the data received by the sensor management component responsive to the poll of the first sensor. The method can include the data processing system generating, by the direct action API, the action data structure based on the first field of the template. The method can include the data processing system transmitting the action data structure to a third party provider device. The method can include the data processing system receiving, from the third party provider device, an indication that the third party provider device established the operation session with the client device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
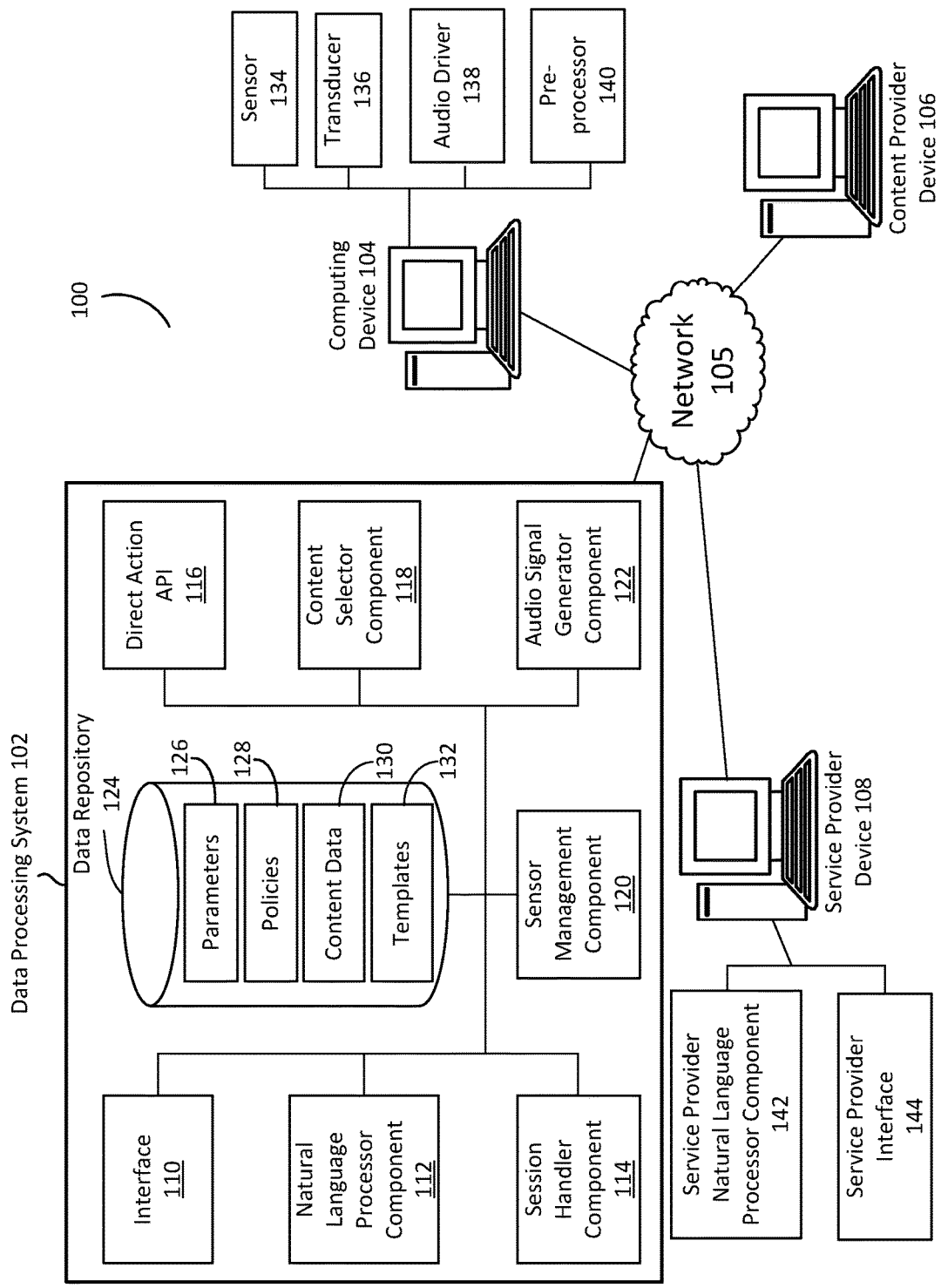
FIG. 1 is an illustration of a system to selectively poll sensors via a computer network.

Following below are more detailed descriptions of various concepts related to, and implementations of, methods, apparatuses, and systems of selectively polling sensors over a computer network. The various concepts introduced above and discussed in greater detail below may be implemented in any of numerous ways.

The present disclosure is generally directed to selectively polling sensors over a computer network. For example, computing systems may have access to multiple sensors configured on multiple computing devices that can detect the same or similar types of information. However, it may be resource intensive to request the same or similar types of information from multiple sensors either configured on the same computing device or a group of computing devices in close proximity to one another such that the detected information is similar. Furthermore, certain sensors, or computing device on which the sensor is configured, may consume greater resources (e.g., energy, battery power, processor utilization, or bandwidth) as compared to other sensors or computing devices. Thus, the systems and methods of the present disclosure can selectively poll one or more sensors to obtain information in a manner that reduces resource consumption.

Systems and methods of the present disclosure are generally directed to a data processing system that selectively polls sensors over a computer network. The data processing system can process voice-based input using voice models trained on aggregated voice input and augmented with end user voice input. The data processing system can identify a template for an action data structure based on a request and trigger keyword in the voice input. The data processing system can determine to populate one or more fields in the template to generate the action data structure. To populate the fields, the data processing system can interface with a sensor management component to selectively poll sensors of one or more computing devices associated with the end user that provided the voice input. The sensor management component can apply a policy or set of rules to identify one or more sensors that are available and can provide the values used to populate the fields of the template to generate the action data structure. The data processing system can receive the values from the selected sensors, generate the action data structure, and transmit the data structure to a third party provider device. The data processing system can then receive an indication from the third party provider device that the operation corresponding to the action data structure has been initiated.

For example, the data processing system can generally improve sensor selection and optimize sensor configurations for collecting data for use by a voice-based system. The data processing system can perform data synchronization or a batch upload when a device enters an online state from an offline state. The data processing system can enable or disable sensors based on characteristics associated with the data being collected, the user, or the task. The data processing system can selectively enable sensors based on a policy that improves data quality while reducing resource utilization. For example, the data processing system can determine that the user is carrying multiple devices with location sensors. The data processing system can determine which device has the greatest power remaining, and request the location from that device only. In another example, the data processing system can determine that a first device is already obtaining location information (e.g., via a navigational application) and piggy-back off that location data.

FIG. 1 illustrates an example system 100 to selectively poll sensors via a computer network. The system 100 can include content selection infrastructure. The system 100 can include a data processing system 102. The data processing system 102 can communicate with one or more of a content provider computing device 106, service provider computing device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a service provider 108 or content provider 106.

The network 105 can include or constitute a display network, e.g., a subset of information resources available on the internet that are associated with a content placement or search engine results system, or that are eligible to include third party content items as part of a content item placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider 106), or the service provider device 108 (or service provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one service provider device 108. The service provider device 108 can include at least one logic device such as a computing device having a processor to communicate via the network 105, for example with the computing device 104, the data processing system 102, or the content provider 106. The service provider device 108 can include at least one computation resource, server, processor or memory. For example, service provider device 108 can include a plurality of computation resources or servers located in at least one data center. The service provider device 108 can include one or more component or functionality of the data processing system 102.

The content provider computing device 106 can provide audio based content items for display by the client computing device 104 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 106 can also provide audio based content items (or other content items) to the data processing system 102 where they can be stored in the data repository 124. The data processing system 102 can select the audio content items and provide (or instruct the content provider computing device 104 to provide) the audio content items to the client computing device 104. The audio based content items can be exclusively audio or can be combined with text, image, or video data.

The service provider device 108 can include, interface, or otherwise communicate with at least one service provider natural language processor component 142 and a service provider interface 144. The service provider computing device 108 can include at least one service provider natural language processor (NLP) component 142 and at least one service provider interface 144. The service provider NLP component 142 (or other components such as a direct action API of the service provider computing device 108) can engage with the client computing device 104 (via the data processing system 102 or bypassing the data processing system 102) to create a back-and-forth real-time voice or audio based conversation (e.g., a session) between the client computing device 104 and the service provider computing device 108. The service provider NLP 142 can include one or more function or feature as the NLP component 112 of the data processing system 102. For example, the service provider interface 144 can receive or provide data messages to the direct action API 116 of the data processing system 102. The service provider computing device 108 and the content provider computing device 106 can be associated with the same entity. For example, the content provider computing device 106 can create, store, or make available content items for a car sharing service, and the service provider computing device 108 can establish a session with the client computing device 106 to arrange for a delivery of a taxi or car of the car share service to pick up the end user of the client computing device 104. The data processing system 102, via the direct action API 116, the NLP component 112 or other components can also establish the session with the client computing device, including or bypassing the service provider computing device 104, to arrange for example for a delivery of a taxi or car of the car share service.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102. The computing device 104 may or may not include a display; for example, the computing device may include limited types of user interfaces, such as a microphone and speaker. In some cases, the primary user interface of the computing device 104 may be a microphone and speaker.

The client computing device 104 can be associated with an end user that enters voice queries as audio input into the client computing device 104 (via the sensor 134) and receives audio output in the form of a computer generated voice that can be provided from the data processing system 102 (or the content provider computing device 106 or the service provider computing device 108) to the client computing device 104, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client computing device 104 and the data processing system 102 (or the service provider computing device 108). The content data 130 can include content items for audio output or associated metadata, as well as input audio messages that can be part of one or more communication sessions with the client computing device 104. The communication session can include or be referred to as an operation session. In some cases, an operation session can refer to a communication session in which one or more operations are performed by the third party provider device 108, client computing device, content provider device 106, data processing system 102 or other component or entity.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one direct action application programming interface ("API") 116. The data processing system 102 can include, interface, or otherwise communicate with at least one session handler 114. The data processing system 102 can include, interface, or otherwise communicate with at least one content selector component 118. The data processing system 102 can include, interface, or otherwise communicate with at least one sensor management component 120. The data processing system 102 can include, interface, or otherwise communicate with at least one audio signal generator 122. The data processing system 102 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, content item objects or other information provided by a content provider 106 or obtained or determined by the data processing system to facilitate content selection. The content data 130 can include, for example, historical performance of a content campaign.

The interface 110, natural language processor component 112, session handler 114, direct action API 116, content selector component 118, sensor management component 120, or audio signal generator component 122 can each include at least one processing unit or other logic device such as programmable logic array engine, or module configured to communicate with the database repository or database 124. The interface 110, natural language processor component 112, session handler 114, direct action API 116, content selector component 118, sensor management component 120, audio signal generator component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects, and content selection criteria. To create a content campaign, content provider 106 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 102 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 104. In some cases, an impression can refer to a viewable or audible impression; e.g., the content item object is at least partially (e.g., 20%, 30%, 30%, 40%, 50%, 60%, 70%, or more) viewable on a display device of the client computing device 104, or audible via a speaker 136 of the computing device

104. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 106 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 106 can provide one or more keywords to be used by the data processing system 102 to select a content item object provided by the content provider 106. The content provider 106 can identify one or more keywords to bid on, and further provide bid amounts for various keywords. The content provider 106 can provide additional content selection criteria to be used by the data processing system 102 to select content item objects. Multiple content providers 106 can bid on the same or different keywords, and the data processing system 102 can run a content selection process or ad auction responsive to receiving an indication of a keyword of an electronic message.

The content provider 106 can provide one or more content item objects for selection by the data processing system 102. The data processing system 102 (e.g., via content selector component 118) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 102 can transmit the content item object for rendering on a computing device 104 or display device of the computing device 104. Rendering can include displaying the content item on a display device, or playing the content item via a speaker of the computing device 104. The data processing system 102 can provide instructions to a computing device 104 to render the content item object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 108. In some cases, the NLP component 112 can transmit the individual requests to respective service provider devices 108, or separately transmit both requests to the same service provider device 108.

The data processing system 102 can include a direct action API 116 designed and constructed to generate, based on the trigger keyword, an action data structure responsive to the request. Processors of the data processing system 102 can invoke the direct action API 116 to execute scripts that generate a data structure to a service provider device 108 to request or order a service or product, such as a car from a car share service. The direct action API 116 can obtain data from the data repository 124, as well as data received with end user consent from the client computing device 104 to determine location, time, user accounts, logistical or other information to allow the service provider device 108 to perform an operation, such as reserve a car from the car share service. Using the direct action API 116, the data processing system 102 can also communicate with the service provider device 108 to complete the conversion by in this example making the car share pick up reservation.

The direct action API 116 can execute a specified action to satisfy the end user's intention, as determined by the data processing system 102. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client computing device 104 to ask the end user questions such as the intended destination of a requested taxi. The direct action API 116 can determine necessary parameters and can package the information into an action data structure, which can then be sent to another component such as the content selector component 118 or to the service provider computing device 108 to be fulfilled.

The direct action API 116 can receive an instruction or command from the NLP component 112, or other component of the data processing system 102, to generate or construct the action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from the template repository 132. Templates can include fields in a structured data set that can be populated by the direct action API 116 to further the operation that is requested of the service provider device 108 (such as the operation of sending a taxi to pick up an end user at a pickup location and transport the end user to a destination location). The direct action API 116 can perform a lookup in the template repository 132 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 104 or a user interface of the device 104.

Polling can refer to actively sampling information of an external device, such as sensor 134, by the data processing system 102, or by the computing device 104 responsive to an instruction from the data processing system 102. Polling can be a synchronous activity. During polling, the data processing system 102 can wait for the sensor 134 to check its readiness, state, detect an environmental condition, or perform any other function or activity that the sensor 134 is configured to perform (e.g., collect and record a temperature reading; detect ambient light level; determine a location; determine pressure; determine altitude; determine speed of motion; or determine direction of motion). In some cases, polling can refer to requesting data from the computing device 104 that is collected, measured, detected or otherwise determined at least in part by using one or more sensors 134.

For example, the direct action API 116 can detect the source location using a location sensor, such as a GPS sensor. The direct action API 116 can obtain further information by submitting a survey, prompt, or query to the end of user of the computing device 104. The direct action API can submit the survey, prompt, or query via interface 110 of the data processing system 102 and a user interface of the computing device 104 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the service provider device 108.

The data processing system 102 can select the template based from the template data structure 132 based on various factors including, for example, one or more of the trigger keyword, request, third party provider device 108, type of third party provider device 108, a category that the third party provider device 108 falls in (e.g., taxi service, laundry service, flower service, or food delivery), location, or other sensor information.

To select the template based on the trigger keyword, the data processing system 102 (e.g., via direct action API 116) can perform a look-up or other query operation on the template database 132 using the trigger keyword to identify a template data structure that maps or otherwise corresponds to the trigger keyword. For example, each template in the template database 132 can be associated with one or more trigger keywords to indicate that the template is configured to generate an action data structure responsive to the trigger keyword that the third party provider device 108 can process to establish a communication session.

In some cases, the data processing system 102 can identify a third party provider device 108 based on the trigger keyword. To identify the third party provide 108 based on the trigger keyword, the data processing system 102 can perform a lookup in the data repository 124 to identify a third party provider device 108 that maps to the trigger keyword. For example, if the trigger keyword includes "ride" or "to go to", then the data processing system 102 (e.g., via direct action API 116) can identify the third party provider device 108 as corresponding to Taxi Service Company A. The data processing system 102 can select the template from the template database 132 using the identify third party provider device 108. For example, the template database 132 can include a mapping or correlation between third party provider devices 108 or entities to templates configured to generate an action data structure responsive to the trigger keyword that the third party provider device 108 can process to establish a communication session. In some cases, the template can be customized for the third party provider device 108 or for a category of third party provider devices 108. The data processing system 102 can generate the action data structure based on the template for the third party provider 108.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 112 (e.g., the location of the client computing device 104 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the client computing device 104, prompting the end user of the client computing device 104 for the information, or accessing an online web-based resource using an HTTP protocol. For example, the data processing system 102 can determine that it does not have the current location of the client computing device 104, which may be a needed field of the template. The data processing system 102 can query the client computing device 104 for the location information. The data processing system 102 can request the client computing device 104 to provide the location information using one or more location sensors 134, such as a Global Positioning System sensor, WIFI triangulation, cell tower triangulation, Bluetooth beacons, IP address, or other location sensing technique.

In some cases, the direct action API 116 can request sensor information from a sensor management component 120. The data processing system 102 can include a sensor management component 120. The sensor management component 120 can execute on the data processing system 102 separate or independent from the client computing device 104. In some cases, the sensor management component 120 can include one or more agents, scripts, executables that are configured on the computing device 104 to interface with the sensor management component 120 executing on the data processing system 102.

The sensor management component 120 can include hardware or software to measure the characteristic of the communication session. For example, the direct action API 116 can select, based on the trigger keyword, a template for an action data structure that corresponds to or is responsive to the request. The template can include one or more fields to be populated, such as a first field and a second field. To populate these fields, the direct action API 116 can query, request from, invoke, or otherwise interface with the sensor management component 120. The sensor management component 120 can obtain the information for the fields by reducing resource utilization by sensors 134 or computing devices 104 associated with the sensors 134. For example, the sensor management component 120 can identify a plurality of available sensors 134 configured to obtain information for the first field. The plurality of available sensors can include a first sensor and a second sensor. The sensor management component 120 can determine a status of each of the plurality of sensors. The sensor management component 120 can select the first sensor of the plurality of sensors based on the status. The sensor management component 120 can poll first sensor for data corresponding to the first field. The direct action API 116 can populate the first field with the data received by the sensor management component responsive to the poll of the first sensor.

The sensor management component 120 can identify a plurality of available sensors 134. The sensor management component 120 can store, in data repository 124, a list of sensors 134 that are available for an end user account associated with a computing device 104. The sensors 134 may have a status as available. Available can refer to the sensor being online, active, standby mode, or in low power mode. A sensor can be available if it passes a diagnostic test or process. In some cases, a sensor 134 may be available even if it is offline if the computing device 104 can be instructed to bring the sensor 134 online. The status of the sensor 134 may be unavailable if the sensor 134 is offline, does not respond timely to a ping, is malfunctioning, provides erroneous or inconsistent values, or fails a diagnostic test or process.

In some cases, the client computing device 104 can push sensor status information to the sensor management component 120 upon establishing a communication session. In some cases, the sensor management component 120 may send a request to the client computing device 104 or one or more client computing devices 104 associated with the account identifier for a list of available sensors 134. The sensor management component 120 can identify a set of one or more computing devices 104 based on a proximity of the computing device to one another, or based on network activity associated with the one or more computing devices 104 (e.g., the end user may be actively using the one or more computing devices 104 to interact with the data processing system 102 or component thereof). In some cases, the data processing system 102 can poll all previously known sensors 134 used by the sensor management component based on a time interval.

Thus, data processing system 102 can identify multiple sensors capable of providing, and available to provide, the data to populate the first field of the template. The data processing system can then select one (or a subset) of the sensors from which to receive data. The data processing system 102 can determine to poll a sensor that is not coupled to the computing device 104 that provided the input audio signal. For example, an end user can use a first computing device 104 to provide the input audio signal. The first computing device 104 can include a first sensor 134 coupled to the first computing device 104. The data processing system can determine that there is a second computing device 104 that is also associated with the end user account (e.g., both the first and second computing devices 104 successfully performed a handshaking process with the data processing system 102). The second computing device 104 can be proximate to the first computing device 104, or the data processing system 102 can otherwise determine that the second computing device 104 can also provide the data of sufficient quality to populate the first field of the template (e.g., the location information that would be provided by the two sensors is within a tolerance level, such as 25 meters, 50 meters, 75 meters, or 100 meters). The data processing system 102 can determine to use the second sensor 134 that is coupled to the second computing device 104 instead of the first sensor 134 coupled to the first computing device, even though the first computing 104 device invoked, initiated, or established the communication with the data processing system 102. The data processing system 102 can use a resource reduction policy to determine to use the second sensor 134 coupled to the second computing device instead of the first sensor 134 coupled to the first computing device 104 that provided the input audio signal to the NLP component 110. The data processing system 102 can determine to use second computing device 104 because it may have more battery remaining, have greater resource availability, or be configured to provide higher quality or more accurate data that can result in fewer subsequent requests for sensor information.

In some cases, the sensor management component 120 can reduce resource utilization by having a first sensor detect a first environmental condition (e.g., location, speed, temperature, ambient light, ambient sound, etc.), while retrieving, from memory, a second environmental condition that was previously detected by a second sensor. Rather than instruct the second sensor to go online or activate to detect the environmental condition, the sensor management component 120 can retrieve the previously detected value from memory to reduce resource utilization. For example, the sensor management component can poll a first sensor for data corresponding to the first field, while obtaining data from memory of the computing device 104 that corresponds to the second field. The second data can be stored in the memory of the computing device 104 prior to the data processing system 102 requesting the second data. The sensor management component 120 may not poll the second sensor 134 responsive to the request for data from the second sensor received from the direct action API 116. The sensor management component 120 can determine to poll the first sensor for data corresponding to the first field, but not to poll the second sensor for data corresponding to the second field. The sensor management component 120 can use a policy, logic, of set of rules to determine whether or not to poll one or more sensors. For example, the policy, logic, or set of rules can include, or be based, on conditional rules, if/then conditions, trigger events, tolerances, thresholds, time interval, location, geographical fencing, or type of activity. For example, the sensor management component 120 can determine to poll the first sensor for location information because the last location data received by the data processing system 102 may have expired based on a time interval (e.g., 10 seconds, 5 seconds, 20 seconds, 30 seconds, 1 minute or more). The data processing system 102 can obtain data from memory for the second sensor because the second sensor may be a temperature sensor and the data processing system 102 may determine that the timestamp of when the last temperature measurement was detected and stored in memory may satisfy a time interval (e.g., 1 minute, 2 minutes, 3 minutes, 5 minutes, 10 minutes, 20 minutes, 30 minutes or more).

The sensor management component 120 can adjust a configuration of a sensor to collect data based on a type of data. For example, the sensor management component 120 can adjust a sample rate, a sample interval, or a sample duration for the sensor. The sensor management component 120 can increase or decrease the sample rate. The sample rate can refer to the number of samples taken during a measurement time interval. The sample rate can include, for example, 0.005 Hz, 0.01 Hz, 0.015 Hz, 0.02 Hz, 0.05 Hz, 0.1 Hz, 0.2 Hz, 0.5 Hz, 0.7 Hz, 1 Hz, 2 Hz, 3 Hz, 5 Hz, 10 Hz or some other sample rate that provides data to create the action data structure while optimizing sensor resource utilization (e.g., data is within a tolerance level to perform an operation without excessive data collection).

The sensor management component 120 can adjust a sample interval. The sample interval can refer to a time period for when the sensor is turned on or actively collecting sensor data. The sample duration can refer to how long the sensor is turned on to actively collect data at the sample rate. For example, the sensor management component 120 can instruct or command the sensor to turn on every 5 minutes (e.g., sample interval) to collect sensor data at 1 Hz (e.g., sample rate) for a duration of 30 seconds (e.g., sample duration). The policies stored in policy data structure 128 can include different values for the sample rate, sample interval, or duration based on the type of sensor, type of activity, or other characteristics.

In some cases, the sensor management component 120 can disable one or more sensors. The sensor management component 120 can disable a sensor based on or responsive to a characteristic of data collected by the sensor. The sensor management component 120 can temporarily or permanently disable the sensor. Disabling the sensor 134 can prevent the sensor from collected or detecting sensor data or taking other measurements. In some cases, disabling the sensor can refer to disabling or turning off electronic hardware or an API that controls or interfaces with the sensor. For example, the computing device 102 can stop polling the sensor for data and collecting and storing the data responsive to an instruction from the sensor management component 120 to disable the sensor 134.

The sensor management component 120 can apply a resource utilization reduction policy to a characteristic of data collected by the first sensor to disable the first sensor. The characteristic of the data can be include or refer to a quality of the data, quantity of the data, data indicating a performance of the sensor, or data indicating availability of computing resource or battery power to continue collecting data. For example, the data can indicate that the sensor is malfunctioning, not calibrated, or is otherwise collecting erroneous data. To prevent collecting further erroneous data and waste resources (e.g., battery power, processing power, or bandwidth), the sensor management component 120 can disable the sensor 134 for a time period. The sensor management component 120 can poll the sensor after the time period and assess the data at that time. If the data again is unsatisfactory (e.g., not consistent with data collected by other sensors, historical data, type of data, format of the data), then the sensor management component 120 can again disable the sensor for a time interval, which may be longer than the first time interval or permanent until the sensor is repaired.

In some cases, data collected from a first sensor can be analyzed by the sensor management component 120 to disable a second sensor of the same computing device or another computing device. For example, a battery sensor can indicate that there is a low battery (e.g., 20% of battery remaining), and then disable one or more sensors of the device 104. In another example, a temperature sensor can indicate that the device is overheating, responsive to which the sensor management component 120 can disable a location sensor or other sensor.

In some cases, the data processing system can identify a plurality of available sensors 134 configured to obtain a same or similar type of information (e.g., location information, activity information, speed, temperature, ambient light, or ambient sound). The sensor management component 120 can determine that a sensor 134 is available if the sensor 134 is functioning properly, can respond to requests for data, or can convey detected data to a computing device 104 that is connected to the network 104 to route the data to the data processing system 102. The sensor management component 120 can determine that the sensor 134 is available if it is proximate to the end user of the computing device 104 or otherwise in a location or configured to collect relevant data used to generate the action data structure.

For example, the sensor management component 120 can determine that there are two sensors configured to collect location information that are both associated with an account of an end user of the computing device 104. The sensor management component 120 can determine that both sensors are proximate to the end user because they are both collecting similar location information based on a comparison of the data collected by the two sensors. The sensor management component 120, applying a policy, can determine to poll only one of the sensors for location data and disable the other sensor in order to reduce resource consumption as compared to having both sensors operating. For example, the two sensors may be configured on two different computing devices 104 that are both proximate to the end user, such as a smartphone and a smartwatch. The sensor management component 120 can determine a battery status of the two different computing devices 104, and select one of the two sensors that are configured on a computing device 104 with greater remaining battery power. The battery power remaining can be a percentage of remaining power, absolute power remaining, or an estimated amount of time the battery can power the computing device 104 under current utilization (e.g., processor or memory utilization, sensor utilization, network interface utilization). Thus, the sensor management component 120 can disable one of the sensors to conserve battery consumption, and request the location information from the active sensor.

In some cases, the sensor management component 120 can piggy back off of previously collected information. For example, the sensor management component can determine that there are a plurality of available sensors proximate to the end user that are configured to obtain location information. The plurality of available sensors can include a first sensor, second sensor, or third sensor. The sensor management component 120 can determine that the first sensor collected current location information of the end user (e.g., within a threshold time such as 1 second, 2 seconds, 3 seconds, or more). This information may have been collected prior to the direct action API requesting sensor information from the sensor management component 120. Further, the sensor management component 120 can determine that the third sensor is in an offline state and lacks the current location information. Therefore, rather than command the third sensor to enter an online state and consume resources, the sensor management component 120 can determine to use the information from the first sensor or poll the first sensor to collect updated location information, while leaving the third sensor in the offline or low-power state.

In some cases, the sensor management component 120 can instruct the client device 104 to perform a batch upload of collected sensor data. A batch upload of collected sensor data can reduce resource consumption as compared to individual uploads or streaming data as the data is collected by the sensor 134. The client device 104 can perform a batch upload responsive to entering an online state from an offline state (e.g., regaining connection to network 104; being turned on; or being in the line-of-sight to a GPS satellite). In some cases, the sensor management component 120 can instruct the computing device 104 to perform a batch upload based on a location, such as entering or exiting a geofence (e.g., a retail location, or other physical location or area). In some cases, the computing device can upload a list of application installed on the computing device 104 (e.g., by accessing a registry of the computing device or other database storing installed applications).

The direct action API 116 can populate the one or more fields (e.g., first field) with data received by the sensor management component 120 responsive to the poll of the first sensor. The direct action API 116 can populate the second field with the data received by the sensor management component 120 from memory of the client device to reduce resource consumption. The direct action API 116 can then generate an action data structure based on the first field and the second field of the template.

The direct action API 116 can transmit the action data structure to a third party provider device (e.g., service provider device 108) to cause the third party provider device 108 to invoke an operation session. An operation session can refer to or include the third party provider device 108 conducting an operation with or based on the action data structure, such as performing the requested service, purchasing the requested product, or invoking a conversational application programming interface (e.g., service provider NLP component 142) to establish an operation session or communication session between the third party provider device 108 and the client computing device 104. Responsive to establishing the operation session or communication session between the service provider device 108 and the client computing device 1004, the service provider device 108 can transmit data packets directly to the client computing device 104 via network 105. In some cases, the service provider device 108 can transmit data packets to the client computing device 104 via data processing system 102 and network 105.

The data processing system 102 can receive, from the third party provider device 108, an indication that the third party provider device 108 established the operation session with the client device 104. For example, the indication can identify the type of operation being performed (e.g., providing a service such as a taxi service; purchasing a product; responding to a query). The data processing system 102 can further receive an indication that an operation was performed during the operation session (e.g., a taxi picked up the end user and transported the end user to the destination location). The indication that the operation was performed can be provided via an operation data structure that includes, for example, an identifier of the end user, timestamp, type of operation, identifier of third party service provider 108, or price. The operation data structure can be formed using a template from template data structure 132. The template can be standard for all operations, or be customized based on a type of operation.

In some cases, the third party provider device 108 can execute at least a portion of the conversational API 142. For example, the third party provider device 108 can handle certain aspects of the communication session or types of queries. The third party provider device 108 may leverage the NLP component 112 executed by the data processing system 102 to facilitate processing the audio signals associated with the communication session and generating responses to queries. In some cases, the data processing system 102 can include the conversational API 142 configured for the third party provider 108. In some cases, the data processing system routes data packets between the client computing device and the third party provider device to establish the communication session. The data processing system 102 can receive, from the third party provider device 108, an indication that the third party provider device established the communication session with the client device 104. The indication can include an identifier of the client computing device 104, timestamp corresponding to when the communication session was established, or other information associated with the communication session, such as the action data structure associated with the communication session. In some cases, the data processing system 102 can include a session handler component 114 to manage an operation session or communication session, and a sensor management component 120 to manage or select sensors from which to collect data.

The data processing system 102 can include, execute, access, or otherwise communicate with a session handler component 114 to establish a communication session between the client device 104 and the data processing system 102. The communication session can refer to one or more data transmissions between the client device 104 and the data processing system 102 that includes the input audio signal that is detected by a sensor 134 of the client device 104, and the output signal transmitted by the data processing system 102 to the client device 104. The data processing system 102 (e.g., via the session handler component 114) can establish the communication session (e.g., operation session) responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session.

The communication session can refer to a network-based communication session in which the client device 104 provides authenticating information or credentials to establish the session. In some cases, the communication session refers to a topic or a context of audio signals carried by data packets during the session. For example, a first communication session can refer to audio signals transmitted between the client device 104 and the data processing system 102 that are related to (e.g., include keywords, action data structures, or content item objects) a taxi service; and a second communication session can refer to audio signals transmitted between the client device 104 and data processing system 102 that are related to a laundry and dry cleaning service. In this example, the data processing system 102 can determine that the context of the audio signals are different (e.g., via the NLP component 112), and separate the two sets of audio signals into different communication sessions. The session handler 114 can terminate the first session related to the ride service responsive to identifying one or more audio signals related to the dry cleaning and laundry service. Thus, the data processing system 102 can initiate or establish the second session for the audio signals related to the dry cleaning and laundry service responsive to detecting the context of the audio signals.

The data processing system 102 can include, execute, or otherwise communicate with a content selector component 118 to receive the trigger keyword identified by the natural language processor and select, based on the trigger keyword, a content item via a real-time content selection process. In some cases, the direct action API 116 can transmit the action data structure to the content selector component 118 to perform the real-time content selection process and establish a communication session between the content provider device 106 (or a third party provider device 108) and the client computing device 104.

The content selection process can refer to, or include, selecting sponsored content item objects provided by third party content providers 106. The content selection process can include a service in which content items provided by multiple content providers are parsed, processed, weighted, or matched in order to select one or more content items to provide to the computing device 104. The content selection process can be performed in real-time or offline. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the data processing system 102 can include a content selector component 118 designed, constructed, configured or operational to select content item objects. To select content items for display in a voice-based environment, the data processing system 102 (e.g., via NLP component 112) can parse the input audio signal to identify keywords (e.g., a trigger keyword), and use the keywords to select a matching content item based on a broad match, exact match, or phrase match. For example, the content selector component 118 can analyze, parse, or otherwise process subject matter of candidate content items to determine whether the subject matter of the candidate content items correspond to the subject matter of the keywords or phrases of the input audio signal detected by the microphone of the client computing device 104. The content selector component 118 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 118 may process the metadata to determine whether the subject matter of the candidate content item corresponds to the input audio signal.

Content providers 106 may provide additional indicators when setting up a content campaign that includes content items. The content provider 106 may provide information at the content campaign or content group level that the content selector component 118 may identify by performing a lookup using information about the candidate content item. For example, the candidate content item may include a unique identifier, which may map to a content group, content campaign, or content provider. The content selector component 118 may determine, based on information stored in content campaign data structure in data repository 124, information about the content provider 106.

The data processing system 102 can receive, via a computer network, a request for content for presentation on a computing device 104. The data processing system 102 can identify the request by processing an input audio signal detected by a microphone of the client computing device 104. The request can include selection criteria of the request, such as the device type, location, and a keyword associated with the request. The request can include the action data structure or action data structure.

Responsive to the request, the data processing system 102 can select a content item object from data repository 124 or a database associated with the content provider 106, and provide the content item for presentation via the computing device 104 via network 105. The content item object can be provided by a content provider device 108 different from the service provider device 108. The content item can correspond to a type of service different from a type of service of the action data structure (e.g., taxi service versus food delivery service). The computing device 104 can interact with the content item object. The computing device 104 can receive an audio response to the content item. The computing device 104 can receive an indication to select a hyperlink or other button associated with the content item object that causes or allows the computing device 104 to identify service provider 108, request a service from the service provider 108, instruct the service provider 108 to perform a service, transmit information to the service provider 108, or otherwise query the service provider device 108.

The data processing system 102 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the content item selected by the content selector component 118 during the real-time content selection process.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 1234 Main Street for destination location, 2 for number of passengers, and economy for the level of service. The audio signal generator component 122 can generate the first portion of the output signal in order to confirm that the end user of the computing device 104 wants to proceed with transmitting the request to the service provider 108. The first portion can include the following output "Would you like to order an economy car from taxi service provider A to pick two people up at 123 Main Street and drop off at 1234 Main Street?"

In some cases, the first portion can include information received from the service provider device 108. The information received from service provider device 108 can be customized or tailored for the action data structure. For example, the data processing system 102 (e.g., via direct action API 116) can transmit the action data structure to the service provider 108 before instructing the service provider 108 to perform the operation. Instead, the data processing system 102 can instruct the service provider device 108 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 108 can return the preliminary information to the data processing system 102 or directly to the client computing device 104 via the network 104. The data processing system 102 can incorporate the preliminary results from the service provider device 108 into the output signal, and transmit the output signal to the computing device 104. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 102 can form a second portion of the output signal. The second portion of the output signal can include a content item selected by the content selector component 118 during a real-time content selection process. The first portion can be different from the second portion. For example, the first portion can include information corresponding to the action data structure that is directly responsive to the data packets carrying the input audio signal detected by the sensor 134 of the client computing device 104, whereas the second portion can include a content item selected by a content selector component 104 that can be tangentially relevant to the action data structure, or include sponsored content provided by a content provider device 106. For example, the end user of the computing device 104 can request a taxi from Taxi Service Company A. The data processing system 102 can generate the first portion of the output signal to include information about the taxi from the Taxi Service Company A. However, the data processing system 102 can generate the second portion of the output signal to include a content item selected based on the keywords "taxi service" and information contained in the action data structure that the end user may be interested in. For example, the second portion can include a content item or information provided by a different taxi service company, such as Taxi Service Company B. While the user may not have specifically requested Taxi Service Company B, the data processing system 102 may nonetheless provide a content item from Taxi Service Company B because the user may choose to perform an operation with Taxi Service Company B.

The data processing system 102 can transmit information from the action data structure to the Taxi Service Company B to determine a pick-up time, time of arrival at the destination, and a price for the ride. The data processing system 102 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 104 can then select the ride provided by Taxi Service Company A or the ride provided by Taxi Service Company B.

Prior to providing, in the second portion of the output signal, the sponsored content item corresponding to the service provided by Taxi Service Company B, the data processing system 102 can notify the end user computing device that the second portion corresponds to a content item object selected during a real-time content selection process (e.g., by the content selector component 118). However, the data processing system 102 can have limited access to different types of interfaces to provide the notification to the end user of the computing device 104. For example, the computing device 104 may not include a display device, or the display device may be disabled or turned off. The display device of the computing device 104 may consume greater resources than the speaker of the computing device 104, so it may be less efficient to turn on the display device of the computing device 104 as compared to using the speaker of the computing device 104 to convey the notification. Thus, in some cases, the data processing system 102 can improve the efficiency and effectiveness of information transmission over one or more interfaces or one or more types of computer networks. For example, the data processing system 102 (e.g., via the audio signal generator component 122) can module the portion of the output audio signal comprising the content item to provide the indication or notification the end user that that portion of the output signal comprises the sponsored content item.

The data processing system 102 (e.g., via interface 110 and network 105) can transmit data packets comprising the output signal generated by the audio signal generator component 122. The output signal can cause the audio driver component 138 of or executed by the client device 104 to drive a speaker (e.g., transducer 136) of the client device 104 to generate an acoustic wave corresponding to the output signal.

Figure 2:
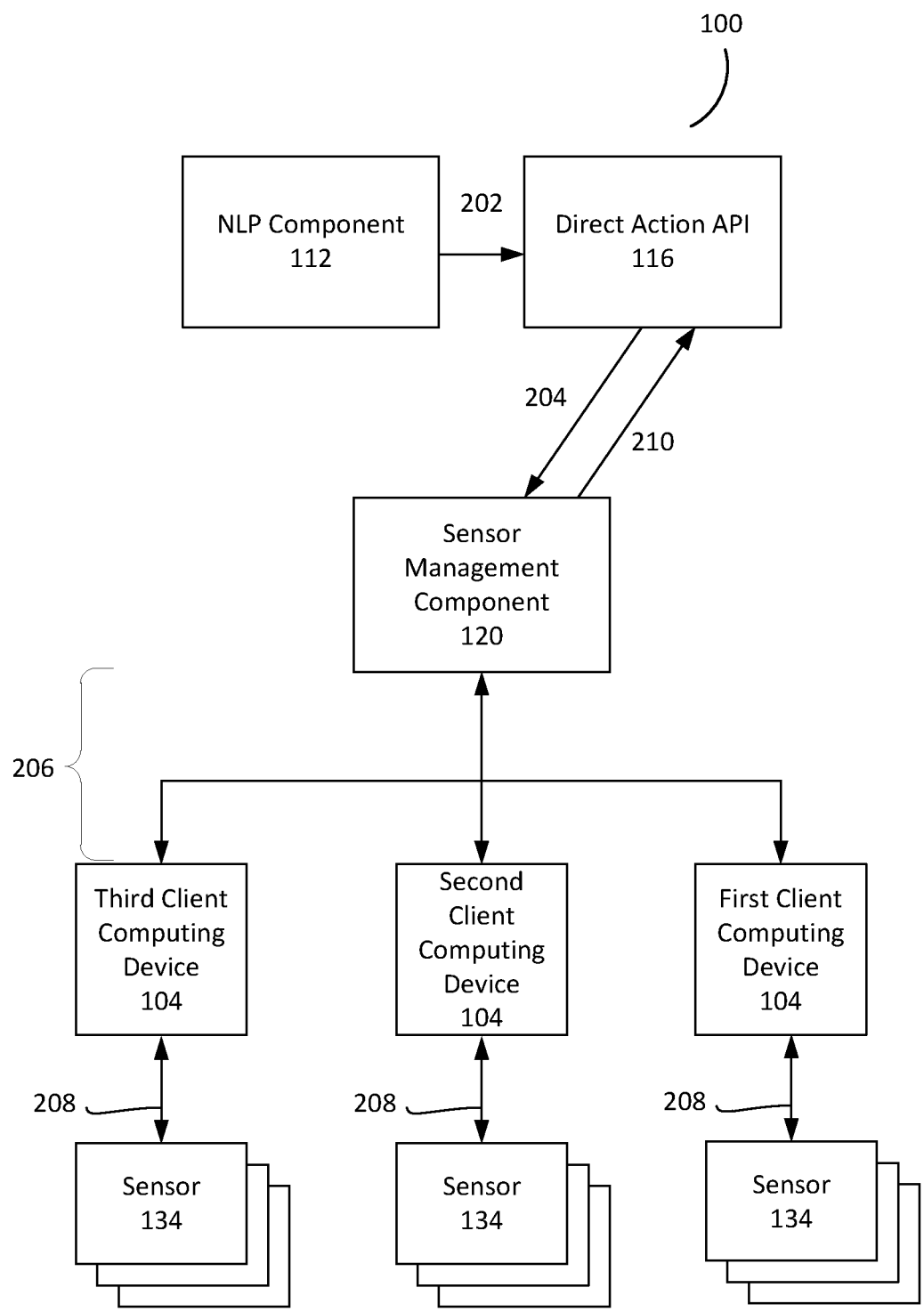
FIG. 2 is an illustration of an operation of system to selectively poll sensors via a computer network.

FIG. 2 is an illustration of an operation of system to selectively poll sensors via a computer network. The system can include one or more component of system 100 depicted in FIG. 1. The NLP component 112 can receive and parse audio signals detected by a computing device. The NLP component 112 can pass information to the direct action API 116 at ACT 202. The direct action API 116 can determine to collect sensor information to populate one or more fields of a template to generate an action data structure responsive to the audio signals parsed by the NLP component 112.

At ACT 204, the direct action API can request the sensor information from the sensor management component 120. The sensor management component 120 can establish a sensor data collection session 206 with a plurality of computing devices (e.g., first, second and third computing devices 104). The sensor management component 120 can poll one or more of the computing devices 104 at ACT 206. The sensor management component 120 can determine to poll only one of the computing devices 104 for sensor data to reduce aggregate resource consumption among the plurality of computing devices 104 that are related to the end user or that provide similar information. The sensor management component 120 can instruct one or more of the computing devices 104 to poll sensors 134.

At ACT 208, one or more of the computing devices 104 can poll, enable, activate, invoke, or otherwise cause a sensor 134 to collect sensor data and provide the sensor data to the computing device 104 to provide to the sensor management component 120 or data processing system 102. The sensor management component 120 can provide the collected sensor data to the direct action API 116 at ACT 210. Thus, the sensor management component 120 can optimize sensor utilization to reduce aggregate resource utilization among the plurality of computing devices 104 associated with the end user (or proximate to the end user that can provide the requested sensor information) by selecting one or more sensors or a subset of sensors to poll.

Figure 3:
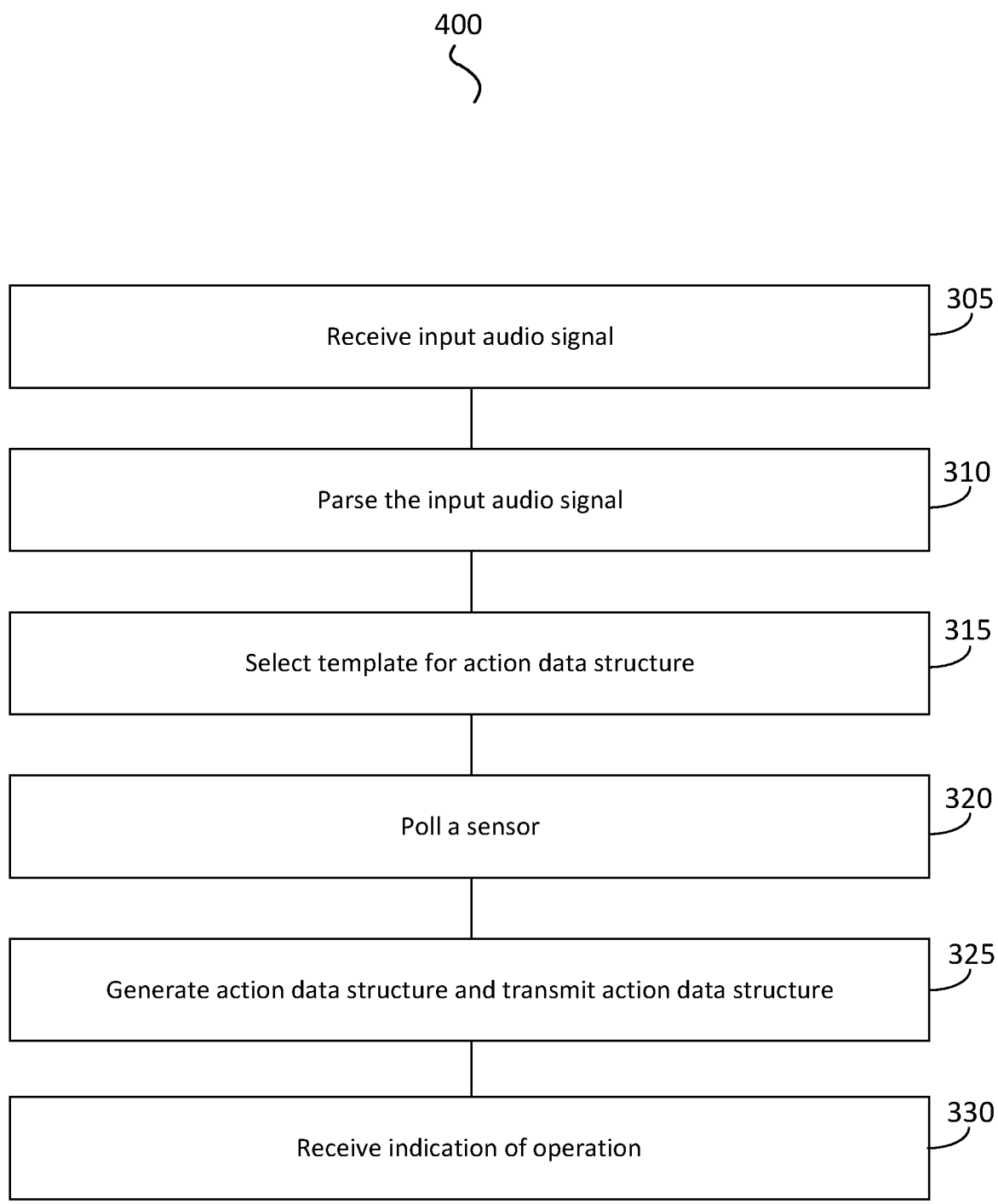
FIG. 3 is an illustration of a method of selectively polling sensors over a computer network.

FIG. 3 is an illustration of an example method of selectively polling sensors. The method 300 can be performed by one or more component, system or element of system 100 or system 400. The method 300 can include a data processing system receiving an input audio signal (ACT 305). The data processing system can receive the input audio signal from a client computing device. For example, a natural language processor component executed by the data processing system can receive the input audio signal from a client computing device via an interface of the data processing system. The data processing system can receive data packets that carry or include the input audio signal detected by a sensor of the client computing device (or client device).

At ACT 310, the method 300 can include the data processing system parsing the input audio signal. The natural language processor component can parse the input audio signal to identify a request and a trigger keyword corresponding to the request. For example, the audio signal detected by the client device can include "Okay device, I need a ride from Taxi Service Company A to go to 1234 Main Street." In this audio signal, the initial trigger keyword can include "okay device", which can indicate to the client device to transmit an input audio signal to the data processing system. A pre-processor of the client device can filter out the terms "okay device" prior to sending the remaining audio signal to the data processing system. In some cases, the client device can filter out additional terms or generate keywords to transmit to the data processing system for further processing.

The data processing system can identify a trigger keyword in the input audio signal. The trigger keyword can include, for example, "to go to" or "ride" or variations of these terms. The trigger keyword can indicate a type of service or product. The data processing system can identify a request in the input audio signal. The request can be determined based on the terms "I need". The trigger keyword and request can be determined using a semantic processing technique or other natural language processing technique.

At ACT 315, the data processing system can select a template for an action data structure. The template can be responsive to the trigger keyword, request, or identified third party provider. The template can include one or more fields, such as a first field.

At ACT 320, the data processing system can poll one or more sensors, or instruct a computing device to poll a sensor. While the data processing system can identify multiple sensors capable of providing the data to populate the first field, the data processing system can select one sensor to poll. The data processing system can determine to poll a sensor that is not coupled to the computing device 104 that provided the input audio signal. For example, an end user can use a first computing device 104 to provide the input audio signal. The first computing device 104 can include a first sensor coupled to the first computing device. The data processing system can determine that there is a second computing device 104 that is also associated with the end user account. The second computing device can be proximate to the first computing device, or the data processing system can otherwise determine that the second computing device can also provide the data of sufficient quality to populate the first field of the template (e.g., the location information that would be provided by the two sensors is within a tolerance level, such as 25 meters, 50 meters, 75 meters, or 100 meters). The data processing system can determine to use the second sensor that is coupled to the second computing device 104 instead of the first sensor coupled to the first computing device, even though the first computing device invoked, initiated, or established the communication with the data processing system 102. The data processing system can use a resource reduction policy to determine to use the second sensor coupled to the second computing device. For example, the second computing device can have more battery remaining, have greater resource availability, or be connected to power.

In some cases, the data processing system can determine to retrieve, from memory, data that was previously detected by a sensor. For example, the data processing system can determine to poll one sensor while not polling a second sensor even though the information from the second sensor is needed to populate the second field. For example, the data processing system can determine to reduce resource consumption by using information previously collected (e.g., prior to a request for sensor data). The data processing system can, therefore, poll the first sensor and use stored data from the second sensor. The data processing system can determine to do so based on rules or policies, or by analyzing the stored data to determine that it satisfies a condition or threshold (e.g., collected within a time interval).

At ACT 325, the data processing system can generate an action data structure with the sensor data. The data processing system can generate the action data structure based on the trigger keyword, request, third party provider device, or other information. The action data structure can be responsive to the request. For example, if the end user of the client computing device requests a taxi from Taxi Service Company A, the action data structure can include information to request a taxi service from Taxi Service Company A. The data processing system can select a template for Taxi Service Company A, and populate fields in the template with values obtained from one or more sensors or memory to allow the Taxi Service Company A to send a taxi to the user of the client computing device to pick up the user and transport the user to the requested destination.

At ACT 330, the data processing system can receive, from the third party provider device, an indication that the third party provider device established the operation session with the client device. The indication can indicate that the operation was initiated, is in pending, in process, or completed. The indication can include a data structure with additional information about the operation.

Figure 4:
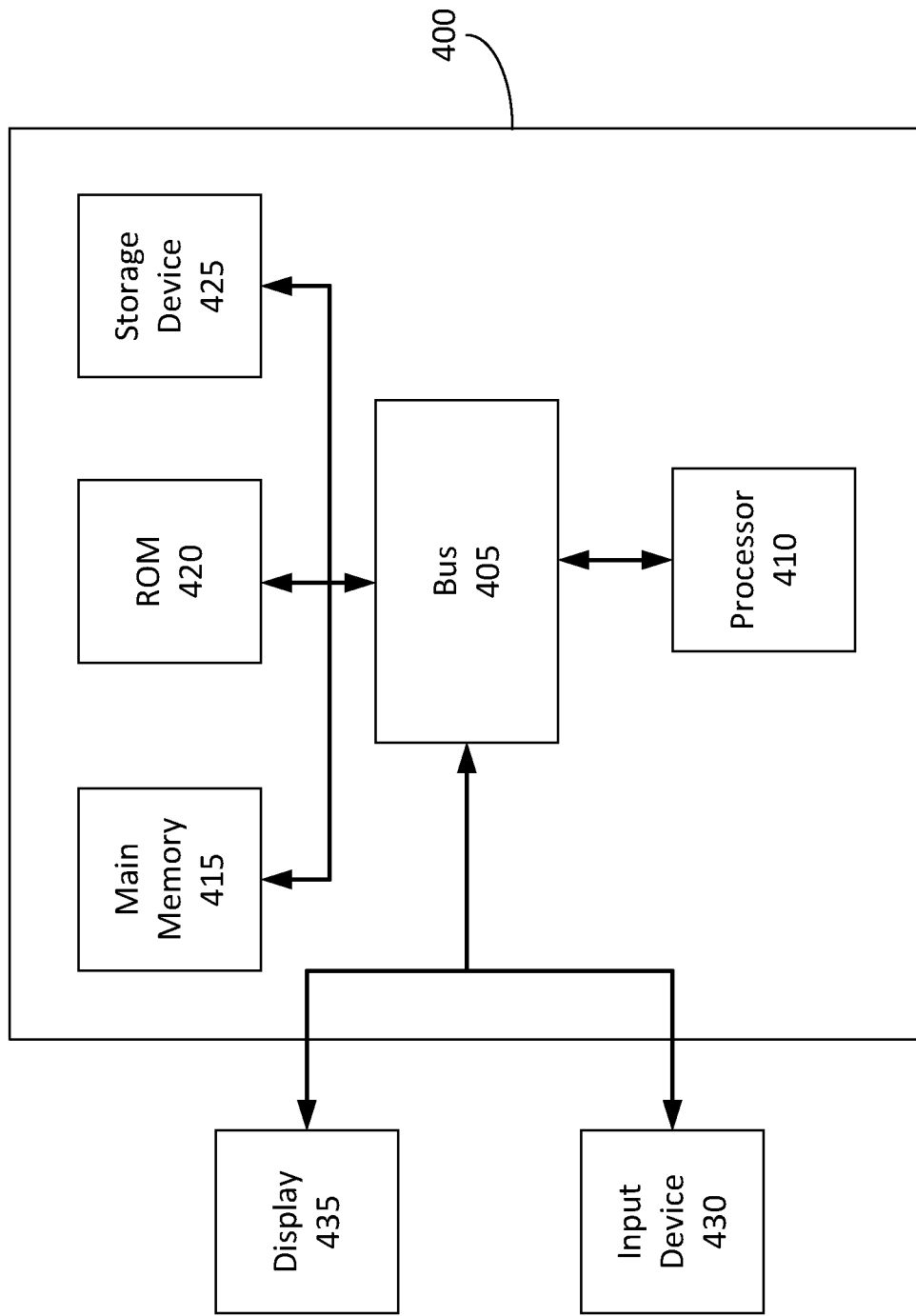
FIG. 4 is a block diagram illustrating a general architecture for a computer system that can be employed to implement elements of the systems and methods described and illustrated herein.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 116, content selector component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the sensor management component 120 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can select a content item for a subsequent action (e.g., for the third action 215) based in part on data from a prior action in the sequence of actions of the thread 200, such as data from the second action 210 indicating that the second action 210 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to selectively poll sensors via a computer network, comprising:
    a natural language processor component executed by a data processing system to receive, via an interface of the data processing system, data packets comprising an input audio signal detected by a microphone of a client device;
    the natural language processor component to parse the input audio signal to identify a request and a trigger keyword corresponding to the request;
    a direct action application programming interface ("API") of the data processing system to select, based on the trigger keyword, a template for an action data structure responsive to the request, the action data structure to package one or more parameters used by a third party provider device to perform an operation to provide a type of service or a type of product, the template comprising a first field;
    a sensor management component of the data processing system to:
        determine not to use a sensor of the client device responsive based on at least one of the sensor in an offline state, failure of the sensor to respond to a ping within a time period, a malfunction of the sensor, or failure by the sensor to pass a diagnostic test;
        identify, responsive to the determination to not use the sensor of the client device, a plurality of available sensors not coupled to the client device that are coupled to a plurality of client devices that i) are each associated with an end user account associated with the client device, ii) are each within a threshold distance of the client device, and iii) have each successfully performed a handshaking process with the data processing system using credentials of the end user account and are currently online, the plurality of client devices comprising a second client device and a third client device;
        identify a plurality of available sensors configured to obtain information for the first field of the action data structure used by the third party provider device to perform the operation to provide the type of service or the type of product, the plurality of available sensors comprising a first sensor of the second client device and a second sensor of the third client device;
        determine a status of each of the plurality of available sensors;
        select, based on the status and the determination to not use the sensor of the client device, the first sensor of the plurality of available sensors of the second client device of the plurality of client devices;
        poll the first sensor for data corresponding to the first field of the action data structure used by the third party provider device to perform the operation to provide the type of service or the type of product;
    the direct action API to populate the first field with the data received by the sensor management component responsive to the poll of the first sensor, and to generate the action data structure to provide the type of service or the type of product based on the first field of the template;
    the direct action API to transmit the action data structure to the third party provider device to cause the third party provider device to invoke an operation session between the third party provider device and the client device and perform one or more actions that provide the type of service or the type of product based on the one or more parameters packaged in the action data structure generated by the direct action API; and
    the data processing system to receive, from the third party provider device, an indication that the third party provider device established the operation session with the client device.

2. The system of claim 1, comprising the data processing system to:
    receive an indication that the operation was performed during the operation session.

3. The system of claim 1, comprising the data processing system to:
    adjust a configuration of the first sensor to collect data based on a type of data.

4. The system of claim 3, wherein the configuration comprises at least one of a sample rate and sample interval.

5. The system of claim 1, comprising the data processing system to:
    determine the client device entered an online state; and
    command the client device to perform a batch upload of collected data responsive to the online state.

6. The system of claim 1, comprising the data processing system to:
  disable, responsive to a characteristic of data collected by the first sensor, the first sensor to prevent the first sensor from data collection.

7. The system of claim 1, comprising the data processing system to:
  apply a resource utilization reduction policy to a characteristic of data collected by the first sensor to disable the first sensor.

8. The system of claim 1, comprising the data processing system to:
  identify a second plurality of available sensors configured to obtain location information, the second plurality of available sensors comprising the first sensor, the second sensor and a third sensor;
  determine a battery status of each of the plurality of available sensors;
  select the first sensor of the plurality of available sensors based on the first sensor having greater battery power than the second sensor and the third sensor;
  disable the third sensor to conserve battery consumption; and
  request the location information from the first sensor.

9. The system of claim 1, comprising the data processing system to:
  identify a second plurality of available sensors configured to obtain location information, the second plurality of available sensors comprising the first sensor and a third sensor;
  determine that the first sensor detected current location information of the client device prior to a request for location information from the data processing system;
  determine that the third sensor is in an offline state and lacks the current location information; and
  obtain the current location information from the first sensor, wherein the third sensor is in the offline state.

10. The system of claim 1, comprising the data processing system to:
  receive, from the client device, a list of applications installed on the client device.

11. A method of selectively polling sensors via a computer network, comprising:
  receiving, by a natural language processor component executed by a data processing system, via an interface of the data processing system, data packets comprising an input audio signal detected by a microphone of a client device;
  parsing, by the natural language processor component, the input audio signal to identify a request and a trigger keyword corresponding to the request;
  selecting, by a direct action application programming interface ("API") of the data processing system, based on the trigger keyword, a template for an action data structure responsive to the request, the action data structure packaging one or more parameters used by a third party provider device to perform an operation to provide a type of service or a type of product, the template comprising a first field;
  determining, by a sensor management component of the data processing system, not to use a sensor of the client device responsive based on at least one of the sensor being in an offline state, failure of the sensor to respond to a ping within a time period, a malfunction of the sensor, or failure by the sensor to pass a diagnostic test;
  identifying, by the sensor management component of the data processing system responsive to the determination to not use the sensor of the client device, a plurality of available sensors not coupled to the client device that are coupled to, a plurality of client devices that i) are each associated with an end user account associated with the client device, ii) are each within a threshold distance of the client device, and iii) have each successfully performed a handshaking process with the data processing system using credentials of the end user account and are currently online, the plurality of client devices comprising a second client device and a third client device;
  identifying, by the sensor management component, a plurality of available sensors configured to obtain information for the first field of the action data structure used by the third party provider device to perform the operation to provide the type of service or the type of product, the plurality of available sensors comprising a first sensor of the second client device and a second sensor of the third client device;
  determining, by the sensor management component, a status of each of the plurality of available sensors;
  selecting, by the sensor management component based on the status and the determination to not use the sensor of the client device, the first sensor of the plurality of available sensors of the second client device of the plurality of client devices;
  polling, by the sensor management component, the first sensor for data corresponding to the first field of the action data structure used by the third party provider device to perform the operation to provide the type of service or the type of product;
  populating, by the direct action API, the first field based on the data received by the sensor management component responsive to the poll of the first sensor;
  generating, by the direct action API, the action data structure to provide the type of service or the type of product based on the first field of the template; and
  transmitting, by the direct action API, the action data structure to the third party provider device to cause the third party provider device to invoke an operation session between the third party provider device and the client device and perform one or more actions that provide the type of service or the type of product based on the one or more parameters packaged in the action data structure generated by the direct action API; and
  receiving, by the data processing system, from the third party provider device, an indication that the third party provider device established the operation session with the client device.

12. The method of claim 11, comprising:
  receiving, by the data processing system, an indication that the operation was performed during the operation session.

13. The method of claim 11, comprising:
  adjusting, by the data processing system, a configuration of the first sensor to collect data based on a type of data.

14. The method of claim 11, wherein the configuration comprising at least one of a sample rate and sample interval.

15. The method of claim 11, comprising:
  determining, by the data processing system, the client device entered an online state; and
  commanding, by the data processing system, the client device to perform a batch upload of collected data responsive to the online state.

16. The method of claim 11, comprising:
disabling, by the data processing system, responsive to a characteristic of data collected by the first sensor, the first sensor to prevent the first sensor from data collection.

17. The method of claim 11, comprising:
applying, by the data processing system, a resource utilization reduction policy to a characteristic of data collected by the first sensor to disable the first sensor.

18. The method of claim 11, comprising:
identifying, by the data processing system, a second plurality of available sensors configured to obtain location information, the second plurality of available sensors comprising the first sensor, the second sensor and a third sensor;
determining a battery status of each of the second plurality of available sensors;
selecting the first sensor of the second plurality of available sensors based on the first sensor having greater battery power than the second sensor and the third sensor;
disabling the third sensor to conserve battery consumption; and
requesting the location information from the first sensor.

19. The method of claim 11, comprising:
identifying a second plurality of available sensors configured to obtain location information, the second plurality of available sensors comprising the first sensor and a third sensor;
determining that the first sensor detected current location information of the client device prior to a request for location information from the data processing system;
determining that the third sensor is in an offline state and lacks the current location information; and
obtaining the current location information from the first sensor, the third sensor in the offline state.

20. The method of claim 11, comprising:
receiving, from the client device, a list of applications installed on the client device.

* * * * *